United States Patent [19]

Faulstroh

[11] Patent Number: 5,265,906
[45] Date of Patent: Nov. 30, 1993

[54] STEERING COLUMN FOR MOTOR VEHICLES

[75] Inventor: Hans-Joachim Faulstroh, Wimsheim, Fed. Rep. of Germany

[73] Assignee: Dr. Ing. h.c.F. Porsche AG, Fed. Rep. of Germany

[21] Appl. No.: 840,185

[22] Filed: Feb. 24, 1992

[30] Foreign Application Priority Data

Mar. 2, 1991 [DE] Fed. Rep. of Germany ....... 4106735

[51] Int. Cl.⁵ ............................................... B62D 1/18
[52] U.S. Cl. ................................... 280/775; 74/89.15; 74/493
[58] Field of Search ............... 280/775; 74/89.15, 493

[56] References Cited

U.S. PATENT DOCUMENTS 4,967,618 11/1990 Matsumoto et al. ........... 280/775 X

FOREIGN PATENT DOCUMENTS 1129790 10/1968 United Kingdom .

*Primary Examiner*—David M. Mitchell
*Assistant Examiner*—Andrew C. Pike
*Attorney, Agent, or Firm*—Evenson, McKeown, Edwards & Lenahan

[57] ABSTRACT

An axially adjustable steering column for motor vehicles has an exterior tube, which is stationarily held on the vehicle body, and an interior tube which is aligned coaxially with respect to the exterior tube and is received in an axially displaceable manner. With a motor transmission unit fastened to the exterior tube, the interior tube is driven to move back and forth axially via a spindle drive. In order to achieve a reduction of the required components and of the mounting expenditures, the interior tube has at least one radially projecting web-shaped wing, and the exterior tube has at least one longitudinal slot recess which is penetrated by the wing of the interior tube with little play. The spindle nut of the spindle drive is thus stationarily arranged on the web-shaped wing of the interior tube, and the spindle is stationarily provided on the exterior tube.

7 Claims, 1 Drawing Sheet

STEERING COLUMN FOR MOTOR VEHICLES

BACKGROUND AND SUMMARY OF THE INVENTION

The present invention relates to an axially adjustable steering column for motor vehicles, in which a coaxially aligned interior tube is received in an axially slidable manner in an exterior tube stationarily held on the vehicle body, and the interior tube comprises a radially extending extension arm which reaches through a longitudinal recess of the exterior tube, which is connected with a motor transmission unit held on the exterior tube and can be driven to travel back and forth in the axial direction by way of a spindle drive.

In the arrangement disclosed in British Patent Document GB-PS 1 129 790 for an axially adjustable steering column for motor vehicles, a slider, which forms a radially projecting extension arm is placed on an axially adjustable interior tube which is arranged concentrically with respect to an exterior tube fixed on the vehicle body by a console. With axial support, a driving spindle is rotatably disposed in this slider which is arranged in parallel to the steering column axis and forms the drive of the interior tube which travels back and forth in the axial direction. In this arrangement, the slider, which forms the radially projecting extension arm, is constructed in the manner of segments and, by means of a base part, also reaches through a recess in the interior tube. This requires a correspondingly wide longitudinal recess in the exterior tube and a corresponding precision recess in the interior tube. Furthermore, considerable expenditures are required for the guiding of the interior tube which is coaxial with respect to the exterior tube. In addition, the spindle of the spindle drive, in turn, is guided in a bearing block mounted on the exterior tube of the steering column and is driven by means of a spindle nut forming a part of an angle drive and disposed in its housing. The drive of the spindle nut, in this case, requires considerable technical expenditures, as does the bearing of the spindle in the slider forming the radially projecting extension arm of the interior tube. Accordingly, this known arrangement requires a large number of components that must be manufactured and mounted individually, making the manufacturing and the mounting of this known steering column considerably more expensive.

In another known arrangement of an axially adjustable steering column for motor vehicles (German Patent Document DE-PS 33 18 935), the interior tube is a toothed rack along a length section and is driven by an endless screw which is disposed on the exterior tube and mates with the toothed rack section. This endless driving screw reaches through the exterior tube, and by means of an angle drive, is driven by a motor which is arranged parallel to the axis of the steering column. This arrangement requires considerable expenditures for the manufacturing of the interior tube and, in addition, also for the construction and arrangement of the motor transmission unit. Because no protection against torsion is provided for the interior tube, this arrangement has only limited operational reliability. In addition, tolerance-compensating devices must be provided in order to be able to guide the interior tube somewhat coaxially with respect to the exterior tube.

An object of the present invention is to provide an axially adjustable steering column for motor vehicles which is operationally reliable and easy to manufacture and particularly consists of relatively few components.

This and other objects are achieved by the present invention which provides an axially adjustable steering column for motor vehicles including an exterior tube stationarily held on a body of the motor vehicle, this exterior tube having at least one longitudinal slot recess. A motor transmission unit is held on the exterior tube. A spindle drive is coupled to the motor transmission unit so as to be driven by the motor transmission unit, the spindle drive including a spindle nut and an interior tubed coaxially aligned an axially slidable within the exterior tube in an axial direction. This interior tube includes at least one web-shaped wing which penetrates the longitudinal slot recess and is connected to the spindle nut such that the interior tube is drivable back and forth in the axial direction by the spindle drive.

The construction of the extension arm as a radially projecting web-shaped wing of the interior tube makes it possible to construct the extension arm together with the interior tube in one piece and at the same time use it as a carrier of the spindle nut of the spindle drive. Thus, in addition to the advantage of a considerable reduction of the required components, because of the easier accessibility to the exterior mounting points, a reduction of the mounting time and therefore of the manufacturing costs is obtained as well as an increase of the operational reliability of the steering column as a whole. The construction of the radially projecting extension arm of the interior tube as at least one web-shaped wing, in connection with a longitudinal slot recess in the exterior tube which is assigned to this wing and has a clearance width which is only by a play or gap width larger than the material thickness of the web-shaped wing, provides an increase in the stability of the exterior tube. It also provides an excellent guidance and protection against torsion for the interior tube. Interaction of a spindle nut stationarily arranged on the web-shaped wing, with a driven spindle of the spindle drive, can be used in this arrangement and becomes operationally reliable, and permits a considerable simplification of the whole driving arrangement.

In another embodiment of the present invention, the interior tube has two radially projecting web-shaped wings which each reach through a longitudinal slot recess in the exterior tube and, with respect to the cross-sectional shape of the interior tube, may be aligned in any arbitrary angular position with respect to one another. In certain embodiments, the two web-shaped wings of the interior tube and the longitudinal slot recesses assigned to them are arranged opposite one another in a plane. In certain embodiments, a bridge member, which partially reaches around the exterior tube and carries the spindle nut of the spindle drive, is connected, for example, by means of a screwed connection, to the two web-shaped wings of the interior tube in the area of their free ends which project beyond the exterior tube. In these embodiments, the bridge member can be a preform, such as a cast part, and the spindle nut can be formed by a threaded bore in the bridge member which is parallel to the axis of the steering column.

With respect to the arrangement of the motor-transmission unit driving the spindle of the spindle drive, depending on the conditions indicated by the other circumstances of the vehicle body or other built-in devices, certain embodiments provide that the motor transmission unit driving the threaded spindle of the spindle drive is mounted on the exterior tube with an alignment that is parallel to the axis of the exterior tube and to the axis of the threaded spindle of the spindle drive.

However, on the other hand, it is also provided in certain embodiments that the motor transmission unit encloses an angle drive and is arranged at a angular position with respect to the longitudinal axis of the exterior tube or to the spindle of the spindle drive which is arranged in parallel to its axis.

Other objects, advantages and novel features of the present invention will become apparent from the following detailed description of the invention when considered in conjunction with the accompanying drawings.

DETAILED DESCRIPTION OF THE DRAWINGS

Figure 1:
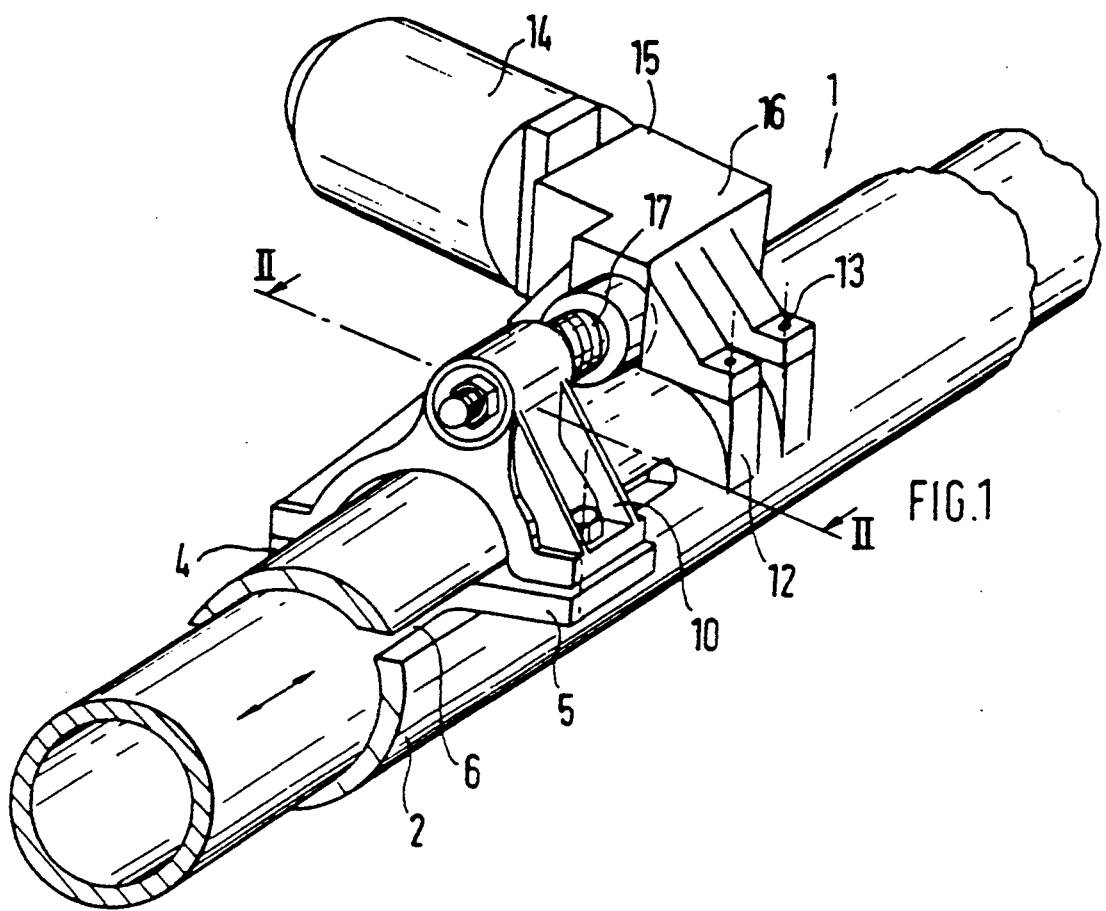
FIG. 1 is a representation, which is diagrammatic in sections, of an axially adjustable steering column for motor vehicles constructed in accordance with an embodiment of the present invention.
Figure 2:
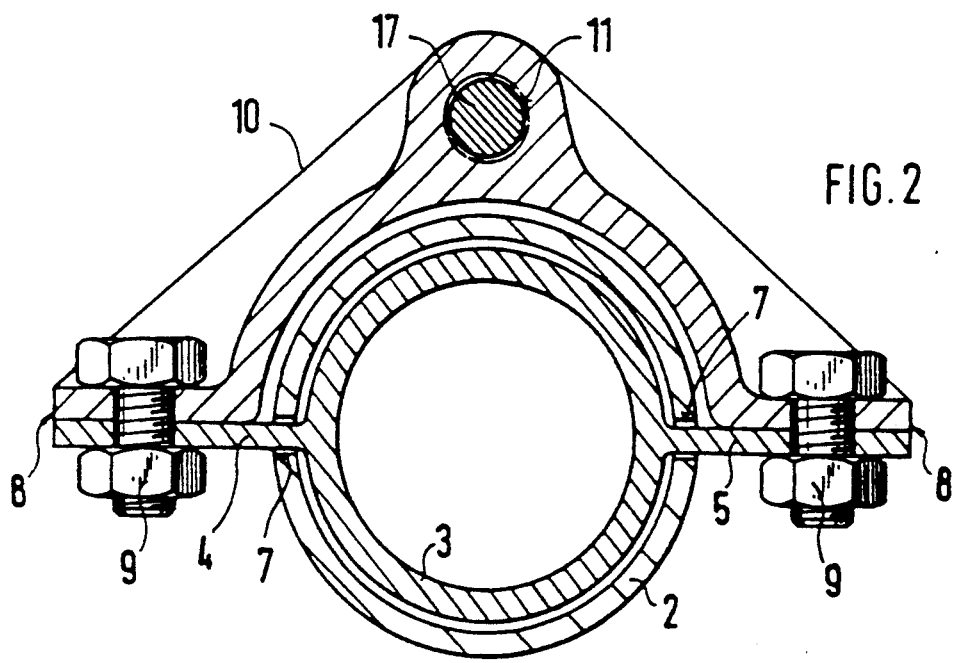
FIG. 2 is a sectional representation along Line II—II according to FIG. 1.

An axially adjustable steering column 1 for a motor vehicle, only partially shown in FIG. 1, comprises an exterior tube 2, which is fastened in a stationary manner to the vehicle body, and an interior tube 3 which is received in a coaxial alignment but in an axially adjustable manner (FIG. 2). The interior tube 3 is provided with two radially projecting web-shaped wings 4 and 5 which are arranged to be situated opposite one another in a plane and to which two longitudinal slot recesses 6 in the exterior tube 2 are assigned which are also arranged to be situated opposite one another. The clearance width of the longitudinal slot recesses 6 is only by a small gap width 7 larger than the material thickness of the web-shaped wings 4 and 5, such that a rotation of the interior tube 3 with respect to the exterior tube 2 is virtually impossible.

On the exterior end areas 8 of the web-shaped wings 4 and 5, which radially project beyond the exterior tube 2, a bridge member 10 is fastened by means of screw bolts 9. In the illustrated embodiment of the present invention, the bridge member 10 is formed by a preform and has sections which reach over the exterior tube 2 in an arched manner. In its upper area, the bridge member 10 has a threaded bore 11 which is aligned in parallel to the axis of the steering column and forms a spindle nut.

A support console 12 is connected to the exterior tube 2 on which, by means of screw bolts 13, a motor transmission unit is mounted which comprises a motor 14 and a transmission 15 as well as an angle drive 16. The motor 14 and the transmission 15 are arranged to be aligned at a right angle with respect to the axis of the steering column. An axial adjustment of the interior tube 3 takes place by means of the angle drive 16, which comprises a spindle 17 which is aligned in parallel to the steering column axis. For this purpose, the spindle 17 is in driving engagement with the threaded bore 11 in the bridge member 10 which forms the spindle nut.

Although not shown explicitly, the motor transmission unit is also mounted to be aligned parallel to the axis of the steering column, in another embodiment of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An axially adjustable steering column for a motor vehicle, comprising:
    an exterior tube adapted to be stationarily held on a body of the motor vehicle, said exterior tube having at least one longitudinal slot recess;
    a motor transmission unit held on the exterior tube;
    a spindle drive coupled to said motor transmission unit so as to be driven by said motor transmission unit, said spindle drive including a spindle and a spindle nut; and
    an interior tube coaxially aligned and axially slidable within said exterior tube in an axial direction, said interior tube including at least one web-shaped wing which penetrates said longitudinal slot recess and is connected to said spindle nut such that said interior tube is drivable back and forth in the axial direction by said spindle drive, wherein the exterior tube has two slot recesses and the interior tube has two radially projecting web-shaped wings each reach through a separate corresponding one of the longitudinal slot recesses.

2. A steering column according to claim 1, wherein each of the two web-shaped wings of the interior tube and the two corresponding longitudinal slot recesses are situated opposite one another in a plane.

3. A steering column according to claim 2, wherein the web-shaped wings are integral with the interior tube, and the longitudinal slot recesses in the exterior tube have a clearance width which is larger by only a gap width than a material thickness of the web-shaped wings.

4. A steering column according to claim 3, further comprising a bridge member which reaches partially around the exterior tube and carries the spindle nut and is connected to areas of the two web-shaped wings which radially project out of the exterior tube.

5. A steering column according to claim 4, wherein the bridge member includes a threaded bore directed in parallel to an axis of the steering column which forms the spindle nut.

6. A steering column according to claim 5, wherein the motor transmission unit which drives the spindle of the spindle drive is mounted on the exterior tube with an alignment that is parallel to the axial direction.

7. A steering column according to claim 6, wherein the motor transmission unit includes an angle drive connected to the spindle of the spindle drive, said motor transmission unit being arranged at an angular position to the longitudinal axis of the exterior tube.

* * * * *